United States Patent [19]
Hirakawa

[11] Patent Number: 5,370,915
[45] Date of Patent: Dec. 6, 1994

[54] RUBBER-RUBBER BONDED COMPOSITE STRUCTURE

[75] Inventor: Hiroshi Hirakawa, Isehara, Japan

[73] Assignee: The Yokohama Rubber Co., Ltd., Tokyo, Japan

[21] Appl. No.: 1,718

[22] Filed: Jan. 7, 1993

[30] Foreign Application Priority Data

| Jan. 8, 1992 | [JP] | Japan | 4-001411 |
| Jan. 8, 1992 | [JP] | Japan | 4-001414 |
| Jan. 8, 1992 | [JP] | Japan | 4-001432 |
| Jan. 10, 1992 | [JP] | Japan | 4-003045 |
| Jan. 16, 1992 | [JP] | Japan | 4-005586 |

[51] Int. Cl.$^5$ .................................. B32B 1/08
[52] U.S. Cl. .................... 428/36.8; 428/390; 428/521
[58] Field of Search ............... 428/521, 424.7, 424.8, 428/36.8, 390

[56] References Cited

U.S. PATENT DOCUMENTS

| 3,344,105 | 9/1967 | McDonel et al. | 268/33 |
| 4,990,570 | 2/1991 | Saito et al. | 525/264 |

FOREIGN PATENT DOCUMENTS

| 675726 | 7/1966 | Belgium . |
| 0431907 | 6/1991 | European Pat. Off. . |
| 0454411 | 10/1991 | European Pat. Off. . |
| 1620808 | 5/1970 | Germany . |
| 3737073A1 | 5/1989 | Germany . |
| 3928928 | 12/1989 | Germany . |
| 2256615A | 12/1992 | United Kingdom . |

*Primary Examiner*—Edith Buffalow
*Attorney, Agent, or Firm*—Finnegan, Henderson, Farabow, Garrett & Dunner

[57] ABSTRACT

A rubber-rubber bonded composite structure is made up of one unvulcanized preform formed from a rubber comprising hydrogenated acrylonitrile-butadiene rubber, either a combination of methacrylic acid and zinc oxide or zinc methacrylate, and an organic peroxide and another unvulcanized preform formed from a rubber composition containing a rubber in common use both preforms having been laminated together into an integrally bonded structure by vulcanization. The resulting structure exhibits good rubber-to-rubber adhesion.

5 Claims, 1 Drawing Sheet

RUBBER-RUBBER BONDED COMPOSITE STRUCTURE

BACKGROUND OF THE INVENTION

1. Field of the Invention

This invention is directed to rubber-rubber composite structures obtained by the unique bonding of preforms formed from specific rubber compositions.

2. Description of the Prior Art

As is generally known, rubber compositions containing hydrogenated acrylonitrile-butadiene rubber, methacrylic acid, zinc oxide and an organic peroxide are colorable in any desired colors and, upon vulcanization, are not only resistant to heat and to oil, impermeable to gas and weatherable but also mechanically strong, hard elastic, stretchable and low in specific gravity. It is made possible to bond by vulcanization an unvulcanized preform formed from such a rubber composition directly onto a similar preform formed from a rubber composition containing a rubber in common use, then a composite structure of rubber-to-rubber bonding will be produced which is blessed with physical characteristics peculiar to the two different rubber compositions. The composite structure thus obtained is expected to be suitable particularly for use as a material for belts, hoses, pneumatic tires and the like. For instance, weight saving has been more and more strict with respect to pneumatic tires in the automobile industry. This trend will be coped with by the use of the above rubber-rubber composite structure if the latter can be employed to partly or wholly form a bead filler, an inner liner, a tread portion and the like for the tire.

Even regardless of physical properties of the ultimate composite structure, it is very difficult to bond, with use of a conventional adhesive for rubber, a preform resulting from a rubber composition containing hydrogenated acrylonitrile-butadiene rubber, methacrylic acid, zinc oxide and an organic peroxide onto a preform resulting from a rubber composition containing a general-purpose rubber. An adhesive of an isocyanate resin or epoxy resin type would make the resulting bonded layer brittle and hence susceptible to failure only under appreciable deformation. The first-and last-mentioned preforms, therefore, are required to be bonded together by vulcanization or in any other way without reliance on a resin type adhesive.

SUMMARY OF THE INVENTION

As a result of continued research, the present inventor has found that there is unknown in the art a rubber-rubber composite structure derived by bonding the foregoing different preforms by vulcanization or without need for a resin type adhesive.

The present invention seeks to provide a new rubber-rubber composite structure obtained by bringing two or more unvulcanized preforms of the character stated above into an integrally bonded form by means of vulcanization or with use of an ultrahigh molecular weight polyethylene film or powder as a bond layer.

The above and other objects and advantages of the invention will be better understood from the following description taken in conjunction with the accompanying drawings.

More specifically, a first aspect of the invention provides a rubber-rubber bonded composite structure comprising:

(1) unvulcanized preform (a) formed from a rubber composition comprising hydrogenated acrylonitrile-butadiene rubber, either a combination of methacrylic acid and zinc oxide or zinc methacrylate, and an organic peroxide; and (2) preform (b) formed from a rubber composition containing unvulcanized isobutylene-isoprene rubber or vulcanized or unvulcanized acrylonitrile-butadiene rubber, wherein preforms (a) and (b) have been laminated together into an integrally bonded structure by vulcanization of both preforms.

A second aspect of the invention provides a rubber-rubber bonded composite structure comprising:

(1) unvulcanized preform (a) formed from a rubber composition comprising hydrogenated acrylonitrile-butadiene rubber, either a combination of methacrylic acid and zinc oxide or zinc methacrylate, and an organic peroxide;

(2) unvulcanized preform (c) formed from a rubber composition containing a rubber having a critical surface tension of 26 to 29 mN/m; and (3) a bond layer formed from ultrahigh molecular weight polyethylene and interposed between unvulcanized preforms (a) and (c), wherein unvulcanized preforms (a) and (c) have been laminated into an integrally bonded structure by fusion of the bond layer and hence by vulcanization of both preforms.

A third aspect of the invention provides a rubber-rubber bonded composite structure comprising:

(1) unvulcanized preform (a) formed from a rubber composition comprising hydrogenated acrylonitrile-butadiene rubber, either a combination of methacrylic acid and zinc oxide or zinc methacrylate, and an organic peroxide;

(2) unvulcanized preform (b-1) formed from a rubber composition containing isobutylene-isoprene rubber;

(3) unvulcanized preform (c) formed from a rubber composition containing a rubber having a critical surface tension of 25 to 35 mN/m and not including isobutylene-isoprene rubber; and (4) a bond layer formed from ultrahigh molecular weight polyethylene and interposed between unvulcanized preforms (b-1) and (c), wherein unvulcanized preforms (a), (b-1) and (c) have been laminated in the order mentioned and with the bond layer into an integrally bonded structure by fusion of the bond layer and hence by vulcanization of all the preforms.

A fourth aspect of the invention provides a pneumatic tire comprising a bead filler and a carcass layer held in interengaged relation to each other, the bead filler being fabricated by unvulcanized preform (a) formed from a rubber composition comprising hydrogenated acrylonitrile-butadiene rubber, either a combination of methacrylic acid and zinc oxide or zinc methacrylate, and an organic peroxide and unvulcanized preform (b-1) formed from a rubber composition containing isobutylene-isoprene rubber, the carcass layer being fabricated by unvulcanized preform (c) formed from a rubber composition containing a rubber having a critical surface tension of 25 to 35 mN/m and not including isobutylene-isoprene rubber, wherein a bond layer formed from ultrahigh molecular weight polyethylene has been interposed between unvulcanized preforms (b-1) and (c), and unvulcanized preforms (a), (b-1) and (c) have been laminated together with the bond layer into an integrally bonded structure by fusion of the bond layer and hence by vulcanization of all the preforms.

A fifth aspect of the invention provides a rubber-rubber bonded composite structure comprising:
(1) unvulcanized preform (a) formed from a rubber comprising hydrogenated acrylonitrile-butadiene rubber, either a combination of methacrylic acid and zinc oxide or zinc methacrylate, and an organic peroxide;
(2) unvulcanized preform (b-1) formed from a rubber composition containing isobutylene-isoprene rubber;
(3) unvulcanized preform (b-2) formed from a rubber composition containing acrylonitrile-butadiene rubber;
(4) unvulcanized preform (c) formed from a rubber composition containing a rubber having a critical surface tension of 25 to 35 mN/m and not including isobutylene-isoprene rubber; and
(5) a bond layer formed from ultrahigh molecular weight polyethylene and interposed between unvulcanized preforms (b-1) and (c), wherein unvulcanized preforms (b-2), (a), (b-1) and (c) have been laminated in the order mentioned and with the bond layer into an integrally bonded structure by fusion of the bond layer and hence by vulcanization of all the preforms.

DETAILED DESCRIPTION OF THE INVENTION

Figure 1:
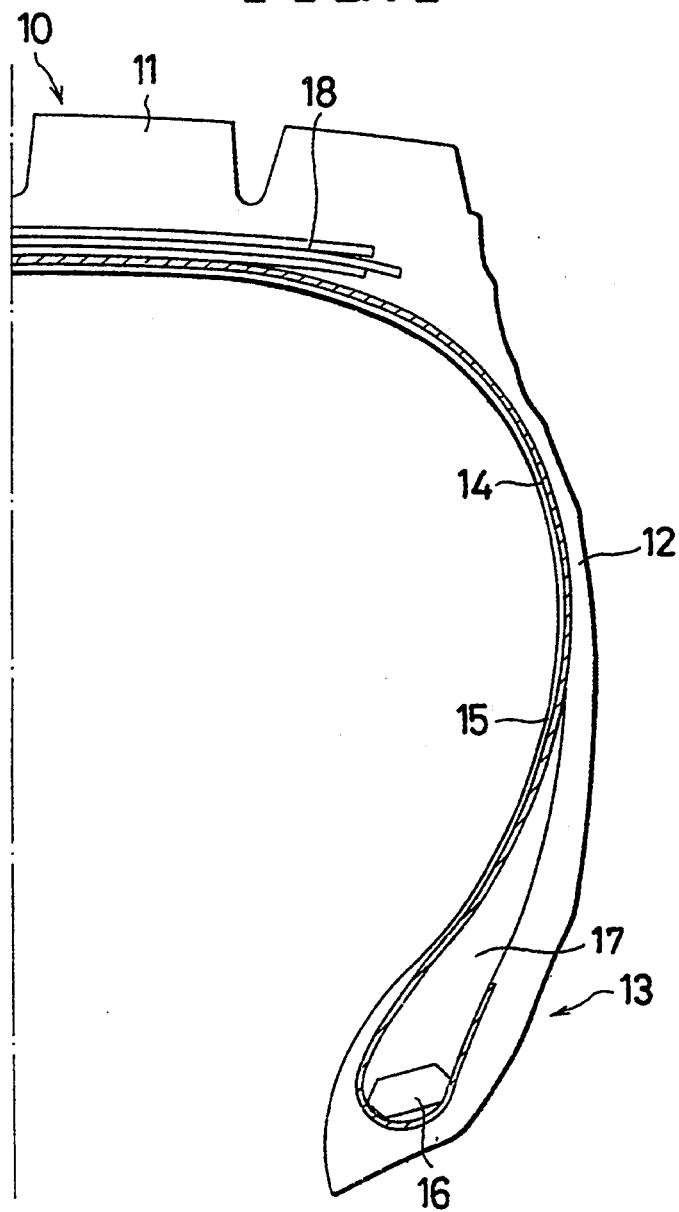
FIG. 1 shows a cross section of a half portion of a pneumatic tire along the meriditional line in which the rubber-rubber bonded composite structure of the present invention is applied to a pneumatic tire at its bead filler.

To implement the present invention, there are used an unvulcanized preform formed from a rubber composition containing hydrogenated acrylonitrile-butadiene rubber, either a combination of methacrylic acid and zinc oxide or zinc methacrylate, and an organic peroxide, and an unvulcanized preform formed from a rubber composition containing a general-purpose rubber. A film or a particulate form of polyethylene of ultrahigh molecular weight (UHMW) may also be employed.

The term hydrogenated acrylonitrile-butadiene rubber as used herein denotes a rubber derived by hydrogenating acrylonitrile-butadiene rubber (NBR) and having an acrylonitrile content of 10 to 60% by weight and a conjugated diene content of less than 30% by weight. This rubber is hereunder referred to as hydrogenated NBR.

The first-mentioned rubber composition comprises 100 parts of hydrogenated NBR, and based on that weight, 20 to 60 parts of methacrylic acid, 10 to 60 parts of zinc oxide and 0.5 to 20 parts of an organic peroxide, the mol ratio of methacrylic acid to zinc oxide being in the range of 1:0.5 to 1:3. All parts here are by weight. Zinc methacrylate may be used which is derived by reaction of methacrylic acid with zinc oxide in equimolar amounts. This rubber composition is for brevity called composition A.

The general-purpose rubber for use in the last-mentioned rubber composition includes, in addition to NBR, isobutylene-isoprene rubber (IIR), ethylene-propylene-diene rubber (EPDM), styrene-butadiene rubber (SBR), natural rubber (NR) and the like.

The film of UHMW polyethylene is a film having a thickness of 10 to 500 82 m, the film being derivable by circumferential or planar skiving of a cylindrical or plate-like molding available from sintering particulate polyethylene of more than 1,000,000 in molecular weight under heat and pressure conditions. The particulate form of UHMW polyethylene is a powder having a molecular weight of more than 1,000,000 and an average particle size of 50 to 300 μm.

According to a first embodiment of the invention, a rubber-rubber composite structure may be produced by laminating an unvulcanized preform (a) formed from composition A over a preform (b) formed from a rubber composition containing NBR or IIR and by vulcanizing the laminate into an integrally bonded form. NBR-preform (b) may be vulcanized or unvulcanized, while IIR-preform (b) is unvulcanized. The resulting composite structure is typically sheet-like or cylindrical and may be of a two- or three-layered structure having vulcanized or unvulcanized NBR-preform (b) or unvulcanized IIR-preform (b) bonded on either one side of preform (a). Two vulcanized NBR-preforms (b) may also be integrally vulcanized with unvulcanized preform (a) sandwiched therebetween.

For a better understanding of composition A according to the invention, enumerated below are details of that composition.

| Material | Weight Part |
|---|---|
| 1) hydrogenated NBR [acrylonitrile content: 10–60 wt. %, conjugated diene content: below 30 wt. %] | 100 |
| 2) methacrylic acid | 20–60 |
| 3) zinc oxide [mol ratio of 2) to 3) = 1:0.5 to 1:3] | 10–60 |
| 4) organic peroxide | 0.5–20 |

The organic peroxide for composition A is for example 1,3-bis(t-butylperoxy-1-propyl)benzene. Composition A, though easy to prepare by admixing the above listed materials in given quantities, is commercially available. A typical example is a product obtainable as "ZSC-2295" from Nippon Zeon Co. This composition may be incorporated, where desired, with a limited amount of hydrogenated NBR.

The NBR- and IIR-containing rubber compositions according to the invention are formulated in known manner with various rubber additives including vulcanization agents such as sulfur and the like, reinforcing agents, such as carbon black and the like, vulcanization accelerators and the like.

A sheet-like or cylindrical rubber-rubber composite structure of the first embodiment may be produced in the following manner. Both an NBR- or IIR-containing rubber composition and composite A are formed as unvulcanized into their respective preforms in the shape of a sheet, cylindrical rod, pipe or hose. In the case of a cylindrical rod, the external diameter of an inner tube is made equal to the internal diameter of an outer tube. When it is found desirable, the preforms may be reinforced, regardless of their shapes, with a metallic cord such as of steel or the like or with an organic fibrous cord such as of nylon, polyester, aramid or the like. The two preforms are superimposed one on the other and then vulcanized under a set of conditions suited for composition A, say at from 150° to 200° C. and at from 5 to 50 kg/cm², whereupon a rubber-rubber bonded composite structure of the invention is obtained.

In a second embodiment of the invention, there is provided a rubber-rubber composite structure in which a preform (a) formed from composition A and a preform (c) formed from a rubber composition containing a general-purpose rubber of 26 to 29 milliNewtons per meter (mN/m) in critical surface tension ($\gamma c$) are bonded with a bond layer of an UHMW polyethylene film or powder interposed therebetween. The composite structure of this embodiment is typically of a sheet-like shape and is of a three- or five-layered structure having one or two preforms (c) bonded onto one or both sides of preform (a) with a bond layer formed from UHMW polyethylene and interposed between each pair of adjoining preforms. Preform (c) according to the invention is prepared from a rubber composition in which are contained a selected rubber having a critical surface tension of 26 to 29 mN/m and any suitable known rubber additives such as sulfur, carbon black, antioxidants, vulcanization accelerators and the like.

The critical surface tensions of rubbers are exemplified in "Handbook of Elastomers, New Development and Technology", A. K. Bohmnik, page 258, Table 1, Marcel Dekker Inc. (1988). Reproduced below is the table of the publication by way of reference.

| Rubber | $\gamma c$ (mN/m) |
| --- | --- |
| IIR | 27 |
| EPDM | 28 |
| NR | 31 |
| SBR | 33 |
| NBR | 38 |

IIR and EPDM among the rubbers listed above are eligible for the purpose of the invention. Other rubbers are suitably useful in the invention if they exhibit their critical surface tensions in the above specified range of 26 to 29 mN/m.

The critical surface tension referred to herein is determined by measuring the respective contact angles $\theta$ of two liquids, usually liquid hydrocarbons, differing in surface tension, on a sample sheet prepared from a base rubber on a hot press and by plotting the contact angle $\cos \theta$ as an ordinate against the surface tensions $\gamma$ of the respective liquids as an abscissa in rectangular coordinates, thereby obtaining a linear curve in which the abscissa value of $\cos \theta = 1$ represents a critical surface tension $\theta c$ of the sheet.

To obtain a rubber-rubber composite sheet structure of the second embodiment, the following procedure may be effected. Unvulcanized preform sheets are formed from a rubber composition containing a selected rubber of 26 to 29 mN/m in critical surface tension and from composition A. The preforms may be reinforced with a metallic cord such as of steel or the like or with an organic fibrous cord such as of nylon, polyester, aramid or the like. The two preform sheets are laminated with an UHMW polyethylene film or particles interposed therebetween and thereafter brought into bonded contact with each other at a temperature of 145° to 300° C. at which the polyethylene material is fused. Both sheets are vulcanized during that fusion stage.

The UHMW polyethylene film is uniformly disposed between the confronting surfaces of both preform or rubber sheets. UHMW polyethylene in its particulate form may be simply sprayed over the rubber sheet, but it is preferred to use a polyethylene material in the form of a paste prepared with liquid paraffin to ensure deposit on the rubber sheet. The polyethylene material if in the form of a film should not exceed 500 $\mu$m in thickness and if in the form of a powder should not be in excess of 300 $\mu$m in particle size. Failure to meet these requirements would render the resulting bonded layer less flexible.

According to a third embodiment of the invention, there is provided a rubber-rubber composite structure comprised of three different preforms (a), (b-1) and (c), preform (a) being formed from composition A, preform (b-1) being formed from an IIR-containing rubber composition and preform (c) being formed from a rubber composition containing a selected rubber of 25 to 35 mN/m in critical surface tension and not including IIR. A bond layer of UHMW polyethylene is interposed between preforms (b-1) and (c). In such instance, preforms (a) and (b-1) are bonded by vulcanization and preforms (b-1) and (c) by fusion of the bond layer. A typical example of the composite structure of this embodiment is a laminate in which preform (a), preform (b-1), UHMW polyethylene and preform (c) are superposed in the order mentioned, all such components being of a sheet-like form. Details as regards the critical surface tension and UHMW polyethylene material used in the third embodiment are as defined above with respect to the second embodiment. Various rubber additives may be incorporated in the rubber composition for preform (c) as stated also in the second embodiment.

To produce a rubber-rubber composite sheet structure of the third embodiment, unvulcanized preform or rubber sheets (a), (b-1) and (c) are formed respectively from composition A, an IIR-containing rubber composition and a rubber composition containing a selected rubber of 25 to 35 mN/m in critical surface tension and not including IIR. These rubber sheets may be reinforced with a metallic or organic fibrous cord as commonly accepted in the art. Rubber sheets (a), (b-1) and (c) are laminated with a bond layer of UHMW polyethylene interposed between rubber sheets (b-1) and (c). Fusion of the bond layer at from 145° to 300° C. brings the resulting laminate into an integrally bonded structure. Rubber sheet (c) may be prevulcanized, in which instance a rubber should be chosen to have a critical surface tension of 25 to 30 mN/m.

As a modified form of the rubber-rubber composite structure of the third embodiment, an UHMW polyethylene film and unvulcanized rubber sheets (b-1) and (a) may be laminated in this order and then vulcanized to form an integrally bonded laminate. Rubber sheet (c) is subsequently disposed over the polyethylene film on the vulcanized laminate, followed by fusion of the film, thereby obtaining a rubber-rubber composite sheet structure.

A fourth embodiment of the invention provides a multi-layered rubber-rubber composite structure resulting from bonding of unvulcanized preforms (a), (b-1), (b-2) and (c). Preform (a) is formed from composition A, preform (b-1) from an IIR-containing rubber composition, preform (b-2) from an NBR-containing rubber composition and preform (c) from a rubber composition containing a selected rubber of 25 to 35 mN/m in critical surface tension and not including IIR. A bond layer of UHMW polyethylene is interposed between preforms (b-1) and (c). Preforms (b-2), (a), (b-1), the bond layer and preform (c) are laminated in the order mentioned, preforms (b-2), (a) and (b-1) being bonded by vulcanization and by fusion of the bond layer into an integrally bonded rubber-rubber composite structure. The composite structure of this embodiment is typically in the form of a sheet. Details of the critical surface tension and UHMW polyethylene material used in the fourth embodiment are as specified above in connection with the second embodiment. The rubber composition for use in each of preforms (b-1), (b-2) and (c) may be incorporated with various rubber additives as referred to hereinabove.

In the formation of a rubber-rubber composite sheet structure of the fourth embodiment, unvulcanized preform sheets (a), (b-1), (b-2) and (c) are prepared, all of which preform sheets are derived from the respective rubber compositions exemplified above. A metallic or organic fibrous cord may be in known manner employed to reinforce those preform sheets. Four preform sheets (b-2), (a), (b-1) and (c) are laminated in this order with an UHMW polyethylene film interposed between preform sheets (b-1) and (c), followed by fusion of the film at from 145° to 300° C. and hence by vulcanization of preform sheets (b-2), (a), (b-1) and (c) into an integrally bonded rubber-rubber composite sheet structure. Prevulcanization of preform (c) may be done, and even in this case, a rubber to be used should be inside a critical surface tension of 25 to 35 mN/m.

Alternatively, unvulcanized preform sheets (b-2), (a) and (b-1) may be laminated with an UHMW polyethylene film laid over preform (b-1) and contacted with one another under heat and pressure conditions into a three-layered sheet-like laminate. Unvulcanized preform sheet (c) is thereafter disposed over the polyethylene film on the vulcanized laminate, followed by contacting of the resultant laminate under similar conditions into an integrally bonded four-layered rubber-rubber composite sheet structure.

The following examples are given to further illustrate the invention. In these examples all rubber compositions are formulated by weight part.

EXAMPLE 1

A commercially available "ZSC-2295" product (Nippon Zeon Co.) was used as component A according to the invention. This product in a 85-part amount was fully admixed on a roll with 15 parts of hydrogenated NBR rubber ("ZETPOL-2020", Nippon Zeon Co.). To the mixture were then added 1.5 parts of an antioxidant ("Nauguard 445", Naugatuck Chemical Co.) and 5 parts of an organic peroxide ("Perkerdox 14/40", Kayaku Akzo Co., 1,3-bis(t-butylperoxyisopropyl)benzene). The whole mixture was further rolled to provide an inventive rubber composition hereunder called rubber composition X.

From rubber composition X a plurality of unvulcanized preform sheets A were formed which were each measured to be 150 mm×50 mm×2.5 mm. Unvulcanized preform sheets B to F of the same dimension were likewise formed from rubber compositions B to F listed in Table 1 below. Preform sheets A were each superimposed on each of preform sheets B to F and bonded together by vulcanization at 170° C. and at 20 kg/cm$^2$ for or 20 minutes to thereby produce rubber-rubber bonded composite structures. Rubber-to-rubber adhesion was checked under the conditions indicated below and with the results shown in Table 2.

A plurality of 20-mm wide test laminate strips were cut out of each of the bonded laminates obtained above. Interface separation testing was done in conventional manner with one of the laminate strips. The mark "x" designates poor adhesiveness as the strip was separated or peeled apart. Those test strips with no interface separation were each cut at around the bonded interface into a set of five sheets of 0.5 mm in thickness. Each set of sheets was cut by a razor in the proximity of the bonded interface. If cohesive failure was observed without interface separation in at least one sheet of each set, this is taken as good adhesiveness as marked by the sign "o".

As is apparent from Table 2, preform sheet A containing inventive composition A is satisfactorily adhesive to preform sheet B containing IIR and also to preform sheet F containing unvulcanized NBR. Satisfactory results have been found to be obtainable even with use of vulcanized NBR-derived preform sheet F. Preform sheet A revealed unacceptable adhesion to preform sheets C to E containing other different rubbers, namely EPDM, NR and SBR, respectively.

EXAMPLE 2

The procedure of Example 1 was followed in forming a plurality of unvulcanized preform sheets A measuring 150 mm×50 mm×2.5 mm from rubber composition X. Unvulcanized preform sheets B to E of the same dimension were formed from rubber compositions B to E of Table 1. Films 50 μm thick were formed by skiving a molded article of polyethylene of 5,000,000 in molecular weight.

Preform sheets A were laminated on each of preform sheets B to E with an UHMW polyethylene film of 50 μm thickness sandwiched therebetween, followed by fusion of the film at 170° C. and at 20 kg/cm$^2$ for 20 minutes and at the same time by vulcanization of the adjoining preform sheets. There were thus produced rubber-rubber bonded laminates. Rubber-to-rubber adhesion was examined as in Example 1 and with the results shown in Table 3.

The test results demonstrate that preform sheet A containing inventive composition A exhibits sufficient adhesion to preform B containing IIR ($\gamma c=27$ mN/m) and also to preform C containing EPDM ($\gamma c=28$ mN/m). Departures from the specified range of critical surface tensions, i.e. from 26 to 29 mN/m, were found to be responsible for insufficient adhesion to preform sheet A in spite of use of the polyethylene film as a bond layer. This appears clear from preform sheet D containing NR ($\gamma c=31$ mN/m) and preform sheet E containing SBR ($\gamma c=33$ mN/m).

EXAMPLE 3

The procedure of Example 1 was followed in obtaining unvulcanized preform sheets A to E of the same dimension. Similar polyethylene films were also formed.

Preform sheets A to E were superposed one on another together with a polyethylene film in varying orders listed in Table 4, followed by fusion of the film at 170° C. and at 20 kg/cm$^2$ for 20 minutes, hence by vulcanization of the mating preform sheets. Performance evaluation was made of rubber-to-rubber adhesion as in Example 1 and with the results shown in Table 4.

To facilitate comparison, unvulcanized preform sheets A and B and an UHMW polyethylene film were laminated in the order mentioned, followed by temporary bonding under the above temperature and pressure conditions. Disposed over the film so treated was preform sheet C which was subsequently subjected to further bonding under those conditions. The resultant three-layered laminate is satisfactory in respect of the desired adhesiveness. A similar three-layered laminate when produced by the use of preform E in place of preform sheet C was found to involve insufficient adhesion.

EXAMPLE 4

This example illustrates a rubber-rubber bonded composite structure of the invention as applied to a pneumatic tire.

Figure 2:
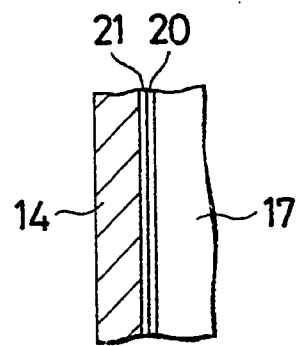
FIG. 2 is a partly enlarged view of the tire of FIG. 1 to explain the manner in which the bead filler is bonded onto a carcass portion.

Referring to the drawings and FIG. 1 in particular, there is shown a pneumatic tire 10 of a 165SR13 size constructed with a bead 13, a sidewall 12 held in interconnected relation to the bead 13 and a tread 11 disposed circumferentially of the tire and having a belt 18 assembled therein. Designated at 14 is a carcass, at 15 is an inner liner, at 16 is a bead core and at 17 is a bead filler. The bead filler 17 is formed from rubber composition X obtained in Example 1 and the carcass 14 from a rubber composition listed in Table 5. As depicted in FIG. 2, the bead filler 17 and the carcass 4 are bonded together with an IIR-containing rubber sheet 20 and a 50-μm thick UHMW polyethylene film 21 interposed therebetween.

The illustrated tire was produced in a way described below.

A bead filler was formed from rubber composition X such that its cross-sectional area directed toward the meriditional line in FIG. 1 is made half that of a conventional pneumatic tire without the height changed. Sandwiched between the bead filler and the carcass were a 0.2-mm thick unvulcanized preform sheet obtained from rubber composition B of Table 1 and an UHMW polyethylene film used in Example 2. In known manner, a green tire was prepared which was thereafter heated in a mold at 170° C., thereby providing an inventive pneumatic tire.

The method of making the inventive tire was followed except that a bead filler was formed from a rubber composition of Table 5 with its meriditionally directed cross-sectional area increased twice that of the inventive tire and that neither a preform sheet nor a polyethylene film was laid between the bead filler and the carcass. A pneumatic tire of the same size was obtained for comparative purposes.

Both the inventive and comparative tires were equally sufficiently driveable. Taking the weight of the bead filler in view, however, the inventive tire has proved to afford a decline or saving as much as 60% as against the comparative counterpart.

EXAMPLE 5

The procedure of Example 1 was followed in obtaining a plurality of each of unvulcanized preform sheets A to F. As regards preform sheet F, vulcanized sheets were also used. Similar UHMW polyethylene films were prepared as were in Example 2.

Preforms A to F were each laminated together with such a polyethylene film in varying orders listed in Table 6, followed by fusion of the film at 170° C. and at 20 kg/cm² for 20 minutes, hence by vulcanization of the adjoining preform sheets. Three-layered laminates were produced which were then subjected to adhesion testing as in Example 1 and with the results shown in Table 6.

Unvulcanized preform sheets F, A and B and a polyethylene film were laminated in the order mentioned, followed by temporary bonding under the above temperature and pressure conditions. Disposed over the film so treated was preform sheet C (vulcanized) which was further bonded under those conditions. The resultant four-layered laminate exhibits sufficient adhesiveness. Replacement of preform sheet F (vulcanized) with the corresponding unvulcanized sheet in that laminate has also led to a four-layered laminate of acceptable adhesion.

TABLE 1

| Rubber Composition | B | C | D | E | F |
|---|---|---|---|---|---|
| IIR (γc = 27 mN/m) | 100 | — | — | — | — |
| EPDM (γc = 27 mN/m) | — | 100 | — | — | — |
| NR (γc = 27 mN/m) | — | — | 100 | — | — |
| SBR (γc = 27 mN/m) | — | — | — | 100 | — |
| NBR (γc = 27 mN/m) | — | — | — | — | 100 |
| carbon black HAF | 50 | 80 | 45 | 55 | 45 |
| zinc oxide | 5 | 5 | 5 | 3 | 3 |
| stearic acid | 1 | 1 | 2 | 2 | 1 |
| antioxidant *1) | 1 | — | 1 | 1 | 1 |
| aromatic process oil | — | — | 5 | 1 | — |
| paraffinic process oil | 5 | 30 | — | — | — |
| process oil DOP | — | — | — | — | 5 |
| accelerator NS *2) | — | — | 0.7 | 1.2 | 0.7 |
| accelerator TT *3) | — | 1.5 | — | — | — |
| accelerator M *4) | — | 0.5 | — | — | — |
| accelerator TS *5) | 1.5 | — | — | — | — |
| accelerator DM *6) | 0.5 | — | — | — | — |
| sulfur | 2.0 | 1.5 | 2.0 | 1.8 | 2.0 |

*1): N-phenyl-N'-isopropyl-p-phenylenediamine
*2): N-t-butyl-2-benzothiazol sulfenamide
*3): tetramethylthiuram disulfide
*4): 2-mercaptobenzothiazle
*5): tetramethylthiuram monosulfide
*6): benzothiazyl disulfide

TABLE 2

| Laminate | Adhesion |
|---|---|
| A/B | o |
| A/C | x |
| A/D | x |
| A/E | x |
| A/F | o |

TABLE 3

| Laminate | Adhesion |
|---|---|
| A/UPE/B | o |
| A/UPE/C | o |
| A/UPE/D | x |
| A/UPE/E | x |

UPE: ultrahigh molecular weight polyethylene film, bond layer

TABLE 4

| Laminate | Adhesion |
|---|---|
| A/B/UPE/C | o |
| A/B/UPE/D | o |
| A/B/UPE/E | o |
| A/UPE/B/D | x |

TABLE 5

| Rubber Composition | Bead Filler | Carcass |
|---|---|---|
| NR | 70 | 50 |
| SBR | 30 | 50 |
| carbon black HAF | — | 45 |
| carbon black No. 339 | 70 | — |
| zinc oxide | 5 | 5 |
| stearic acid | 2 | 2 |
| antioxidant *1) | 1 | 1 |
| aromatic process oil | 7 | 5 |

TABLE 5-continued

| Rubber Composition | Bead Filler | Carcass |
| --- | --- | --- |
| accelerator BS *2) | 1 | — |
| accelerator NS *3) | — | 0.7 |
| sulfur | 2 | 2 |

*1): N-phenyl-N'-isopropyl-p-phenylenediamine
*2): N-oxydiethylene-2-benzothiazole sulfenamide
*3): N-t-butyl-2-benzothiazole sulfenamide

TABLE 6

| Laminate | Adhesion |
| --- | --- |
| F/A/B/UPE/D | o |
| F/A/B/UPE/C | o |
| F/A/B/UPE/E | o |
| F/UPE/C/B/D | x |
| A/C | x |

What is claimed is:

1. A rubber-rubber bonded composite structure comprising:

(1) unvulcanized preform (a) formed from a rubber composition comprising hydrogenated acrylonitrile-butadiene rubber, either a combination of methacrylic acid and zinc oxide or zinc methacrylate, and an organic peroxide; and (2) preform (b) formed from a rubber composition consisting essentially of unvulcanized isobutylene-isoprene rubber or vulcanized or unvulcanized acrylonitrile-butadiene rubber, wherein preforms (a) and (b) have been laminated together into an integrally bonded structure by vulcanization of both preforms.

2. The composite structure of claim 1 wherein the rubber composition in unvulcanized preform (a) comprises 100 parts by weight of a first hydrogenated acrylonitrile-butadiene rubber, and based on that weight, 20 to 60 parts by weight of methacrylic acid, 10 to 60 parts by weight of zinc oxide and 0.5 to 20 parts by weight of a first organic peroxide, the mol ratio of methacrylic acid to zinc oxide being in the range of 1:0.5 to 1:3.

3. The composite structure of claim 2 wherein the rubber composition in unvulcanized preform (a) further includes a second hydrogenated acrylonitrile-butadiene rubber, an antioxidant and a second organic peroxide.

4. The composite structure of claim 1 wherein each of preforms (a) and (b) is a sheet-like, cylindrical rod, pipe or hose form.

5. The composite structure of claim 4 wherein two sheets of preform (b) are laminated with a sheet of preform (a) interposed therebetween.

* * * * *